United States Patent [19]

Ocvirk et al.

[11] Patent Number: 4,826,258

[45] Date of Patent: May 2, 1989

[54] ANTI-LOCK BRAKE SYSTEM WITH TRACTION SLIP CONTROL

[75] Inventors: Norbert Ocvirk, Offenbach; Lutz Weise, Mainz, both of Fed. Rep. of Germany

[73] Assignee: Alfred Teves GmbH, Frankfurt am Main, Fed. Rep. of Germany

[21] Appl. No.: 107,237

[22] Filed: Oct. 8, 1987

[30] Foreign Application Priority Data

Oct. 15, 1986 [DE] Fed. Rep. of Germany ....... 3635056

[51] Int. Cl.$^4$ .......................... B60T 8/32; B60K 28/16
[52] U.S. Cl. .................................... 303/119; 303/113; 303/114
[58] Field of Search ............... 303/119, 114, 116, 113, 303/110, 10, 52; 188/181 R

[56] References Cited

U.S. PATENT DOCUMENTS

| | | | |
|---|---|---|---|
| 4,362,339 | 12/1982 | Belart | 303/113 |
| 4,521,061 | 6/1985 | Belart et al. | 188/181 R |
| 4,555,144 | 11/1985 | Belart et al. | 303/119 |
| 4,578,951 | 4/1986 | Belart et al. | 303/114 |
| 4,585,281 | 4/1986 | Schnurer | 303/116 |
| 4,627,669 | 12/1986 | Belart et al. | 303/114 |

FOREIGN PATENT DOCUMENTS

| | | |
|---|---|---|
| 3137287 | 1/1984 | Fed. Rep. of Germany . |
| 3438401 | 4/1986 | Fed. Rep. of Germany . |
| 3527190 | 2/1987 | Fed. Rep. of Germany . |
| 3247497 | 6/1987 | Fed. Rep. of Germany . |
| 2173559 | 10/1986 | United Kingdom . |
| 2173270 | 10/1986 | United Kingdom . |

Primary Examiner—Andres Kashnikow
Assistant Examiner—Mark T. Le
Attorney, Agent, or Firm—James B. Raden

[57] ABSTRACT

An anti-lock brake system with traction slip control is disclosed. The system is the type including a pedal activated, auxilary force assisted braking pressure generator having two brake circuits. Each circuit supplies electromechanical valves controlled by an electronic controller in response to wheel behavior to increase and decrease brake pressure so as to control brake action and prevent wheel lock up. A normally closed valve is provided in at least one of two supply lines from an auxiliary pump and accumulator to the wheel brake inlet valve for controlling traction slip. A portion of the supply line which interconnects the pump and the valve communicates with one of the two main brake lines through a short-circuit line including a pressure relief valve. The pressure relief valve permits delivery of pressure fluid into the main brake line above a nominal pressure and prevents flow in the opposite direction.

10 Claims, 3 Drawing Sheets

ANTI-LOCK BRAKE SYSTEM WITH TRACTION SLIP CONTROL

BACKGROUND OF THE INVENTION

The present invention relates to an anti-lock brake system having traction slip control which includes a pedal-actuated, preferably auxiliary-force-assisted braking pressure generator having a master cylinder, to which the wheel brakes are connected by way of main brake lines, an auxiliary-pressure hydraulic supply system and wheel sensors and electronic circuits for determining the wheel rotational behavior and for generating electric braking-pressure control signals which, for the purpose of slip control, serve to control electromagnetically actuatable pressure-fluid inlet valves and outlet valves provided in the pressure-fluid lines. The brake lines communicate by way of supply lines with electrically driven pumps whose suction ports are connected to the supply reservoir by a suction line.

In known brake systems of this type, such as the German published patent application Nos. 30 40 561 (See U.S. Pat. No. 4,415,210) and 30 40 562 (See U.S. Pat. No. 4,416,491), a master cylinder having a hydraulic brake power booster connected upstream thereof is used as a braking pressure generator. The auxiliary-pressure supply system includes a hydraulic pump and a hydraulic accumulator, from which auxiliary pressure proportional to pedal force is delivered on brake application with the aid of a control valve. On the one hand, this dynamic pressure is transmitted by way of the master cylinder into the static brake circuits connected to the master cylinder. On the other hand, the wheel brakes of one axle, preferably those of the rear axle, are in direct communication with the pressure chamber of the booster into which the pressure proportional to pedal force is introduced through the control valve. For the purpose of slip control, inlet valves are provided in both the static circuits and the dynamic circuit, which valves normally assume their opened position and which, in the event of an imminent locked condition of a wheel, serve to shut off the pressure-fluid flow to the wheel brake effected.

There are also provided outlet valves which allow pressure fluid to discharge from the effected wheel brake to the pressure-compensating reservoir. On commencement of slip control, the booster chamber into which the controlled pressure from the auxiliary-pressure supply system is introduced, in connected by way of a main valve with the static brake circuits of the master cylinder in order to replenish the quantity of pressure fluid which is removed from the static circuit through the outlet valves. In addition, for safety reasons, the piston of the master cylinder, or pistons in the case of a tandem master cylinder, are reset or fixed by means of a positioning device. The structural complexity required for generating, storing and controlling the hyraulic auxiliary pressure, for dynamic fluid delivery into the static circuits and for safeguarding the brake functions on failure of individual circuits is considerable.

In brake systems of this type, the control signals for the inlet valves and outlet valves are generated by means of electronic circuits, the inputs of which are connected to wheel sensors, for example, inductive pickups, for measuring wheel rotational data, and which are able to react to changes in the wheel rotational behavior indicative of an imminent locked condition. The control signals operate the valves to maintain the pressure at the wheel concerned constant, by reducing and increasing the pressure required.

SUMMARY OF THE INVENTION

It is the object of the present invention to provide an anti-lock brake system with traction slip control such that relatively valves are penetrated by fluid in the event of brake pressure control. Furthermore, it is an object of the invention to completely reset the master cylinder in position after each slip control action so that a maximum reserve for braking is guaranteed upon a pump failure. A further object of the invention is to provide for traction slip control both in the case of diagonal brake-circuit allotmen and front axle/rear axle brake-circuit allotment for both front drive and rear drive applications.

These objects are achieved according to the present invention in that a valve is provided in at least one of two supply lines through which pressure fluid can be delivered into a brake circuit for the purpose of traction slip control. The portion of the supply line interconnecting the auxiliary pump and the valve communicates with one of the main brake lines by way of a short-circuit line and with a pressure-relief valve which is provided in the short-circuit line which permits the delivery of pressure fluid by way of a branch line into the main brake line after a nominal pressure is exceeded, which however, prevents the pressure fluid from flowing in opposite direction. A pressure-fluid accumulator is in communication with this short-circuit line, which accumulator is supplied by the pump until attainment of the nominal pressure.

BRIEF DESCRIPTION OF THE DRAWING

The invention will be better understood after reading the following Detailed Description of the Preferred Embodiment in conjunction with the drawing in which.

DETAILED DESCRIPTION OF THE PREFERRED EMBODIMENT

Figure 1:
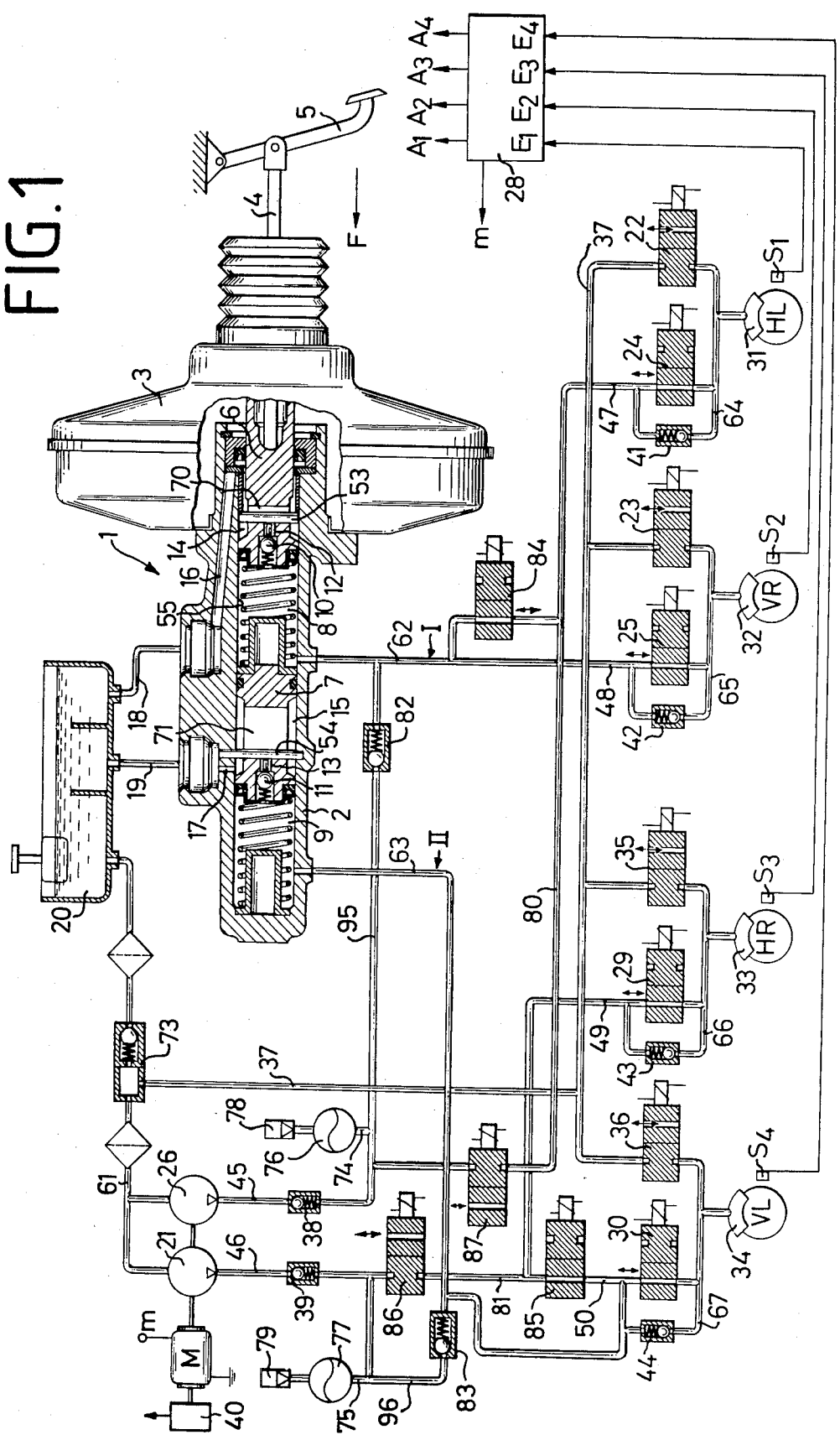
FIG. 1 is partial cross section and schematic representation of a preferred embodiment of the brake system according to the invention.

In the embodiment illustrated in FIG. 1, the inventive brake system includes a braking pressure generator 1, a hydraulic unit which includes a tandem master cylinder 2 and a vacuum booster 3 connected upstream thereof. Pedal force F applied on a bake pedal 5 is transmitted by a push rod 4 in a known fashion onto the vacuum booster 3 which force is boosted by an auxiliary force and applied to the working pistons 6 and 7 of the tandem master cylinder 2.

In the shown release position of the brake, the pressure chambers 8, 9 of the master cylinder 2 are in communication wih a pressure-compensating and pressure-fluid supply reservoir 20 by way of normally open central valves 10, 11, connecting channels 12, 13 in the interior of the pistons 6, 7, annular chambers 14, 15, connecting bores 16, 17 and hydraulic lines 18, 19.

The two brake circuits I, II connected to the master cylinder 2 communicate with the wheel brakes 31, 32;

33, 34 by way of electromagnetically actuatable normally open when de-energized inlet valves 24, 25 and 29, 30, respectively. In both front and rear drive applications the wheel brakes 31, 32 and 33, 34, respectively, are located at diagonal locations on the vehicle with each pair 31, 32 and 33, 34 being hydraulically connected in parallel.

The wheel brakes 31, 32, 33, 34 are further connected to normally closed, i.e., in their de-energized state, electromagnetically actuatable outlet valves 22, 23 and 35, 36, respectively. The outlet valves are in communication with the pressure-compensating reservoir 20 through a hydraulic return line 37, on the one hand, and communicate with the suction sides of the pumps 21, 26 by way of a suction line 61. The pumps are hydraulic pumps driven by an electric motor M. The motor is electrically connected to a source at electrical connection m and is grounded to the vehicle. There is also provided an electrically operating function-monitoring device, shown in block diagram as monitoring circuit 40, which functions to monitor the mode of operation of the motor M.

The vehicle wheels are equipped with inductive sensors $S_1$, $S_2$, $S_3$, $S_4$ which cooperate with a toothed disc rotating synchronously to the wheel rotation and generate electric signals indicative of the wheel rotational behavior such as the wheel speed and variations thereof. These signals are fed by way of the inputs $E_1$, $E_2$, $E_3$, $E_4$ to an electronic signal-processing and combining circuitry 28 which generates braking-pressure control signals serving to temporarily switch over the inlet and outlet valves 22, 23, 24, 25, 29, 30, 35, 36 on detection of an imminent locked condition and to thereby keep the braking pressure constant by decreasing and increasing the pressure at the appropriate time. Accordingly, the actuating magnets of the inlet and outlet valves are driven by the outputs $A_1$, $A_2$, $A_3$, $A_4$. The electric connecting lines between the outputs $A_1$, $A_2$, $A_3$, $A_4$ and the coils of the valves 22, 23, 24, 25, 29, 30, 35, 36 are not illustrated for the sake of simplicity.

The circuitry 28 can be provided in a known fashion by hard-wired circuits or by programmed electronic units, such as microcomputers or microcontrollers.

The signal for starting the drive motor M of the hydraulic pumps 21, 26 which must run during a slip control action is applied to the motor M through the connection m.

A brake-circuit protection valve 73 is provided in either the return line 37 or the suction line 61. The valve is designed as a non-return valve with an intermediate reservoir and allows replenishment supply of pressure fluid out of the pressure-fluid supply reservoir 20. Also, pressure accumulators 76, 77 have associated pressure-monitoring switches 78, 79 and are connected by branch lines 74, 75 to the supply lines 45, 46 which interconnect the pumps 21, 26 and the main brake lines 62, 63. The pressure accumulators are in communication with the inlet valves 24, 25 and 29, 30, respectively, through pressure lines 80, 81 which include directional control valves 86, 87 and 84, 85, respectively.

The brake system operates as follows:

On brake application, the pedal force F, boosted by the vacuum in the booster 3, is transmitted onto the master cylinder pistons 6, 7. The central control valves 10, 11 close, thus allowing braking pressure to develop in the pressure chambers 8, 9 and hence in the brake circuits I, II which then propagates by way of the main brake lines 62, 63 and the valves 24, 25 and 29, 30, respectively, to the wheel brakes 31, 32 and 33, 34, respectively. The directional valves 84, 85 in this state of operation assume their opened position.

On detection of an imminent locked condition at one or more of the wheels by means of the sensors $S_1$, $S_2$, $S_3$, $S_4$ and the circuitry 28, slip control will commence. The drive motor M of the pumps 21, 26 will be switched on, whereby pressure develops in the two supply lines 45, 46 which is applied on the wheel cylinders of the wheel brakes 31, 32, 33, 34 by way of the non-return valves 38, 39, the branch lines 47, 48 and 49, 50, respectively, and the inlet valves 24, 25 and 29, 30, respectively. The pressure also acts upon the pressure chambers 8, 9 of the master cylinder 2.

A signal from the circuitry 28 results in change-over of the electromagnetically actuatable inlet valves 24, 25 and 29, 30, respectively, and thus inclosure of the brake circuits I, II and the branch lines 47, 48, 49, 50, respectively. Further displacement of the master cylinder pistons 6, 7 in the direction of the pedal force F as well as emptying of the pressure chambers 8, 9 is precluded. The pressure fluid from the pumps 21, 26 flows by way of the supply lines 45, 46, the opened non-return valves 38, 39, the short circuit lines 95, 96 and their associated pressure-relief valves 82, 83 and the main brake lines 62, 63 back into the pressure chambers 8, 9, and urges the pistons 6, 7 back to their initial positions. The fluid also flows by way of the central control valves 10, 11, into the reservoir 20. The actual braking pressure variation in the wheel brakes 31, 32, 33, 34 is determined by the inlet and outlet valves 29, 30, 35, 36, which are operated by slip-controlling braking-pressure control signals over the lines $A_1$, $A_2$, $A_3$, $A_4$.

As can be seen from the drawing, the inlet valves 24, 25 and 29, 30, respectively, are protected by parallel connected non-return valves 41, 42, and 43, 44, respectively. In special cases, the non-return valves 41, 42, 43, 44 permit a termination of the braking pressure control and release of the wheel brakes, respectively, since a small quantity of pressure fluid can flow back from the wheel brakes 32, 32, 33, 34 into the pressure chambers 8, 9, with the inlet valves 24, 25 and/or 29, 30 and the outlet valves 22, 23 and/or 35, 36 closed, provided that the piston 6, 7 of the master cylinder 2 have been returned to their initial position and the central control valves 10, 11 are in their opened condition.

Each central control valve 10, 11 includes a tappet which is slidably accommodated in a longitudinal bore of the piston 6, 7 and whose one end abuts on a stationary stop 53, 54 which extends transversely through the piston bore 55 of the master cylinder 2 and which lifts the valve ball from its valve seat in the release position. The valve ball 10 is held in a cage which encloses a rubber cushion or a plug of any elastic material and which can be displaced in opposition to the force of a closure spring. In the position of the valve shown, the pressure fluid can flow out of the pressure chambers 8 and 9, respectively, through an annular gap between valve ball 10 and the valve seat, through the connecting channel 12 and the transverse groove 70 into the annular chambers 14 and 15, respectively, and from there through the channel 16 back into the pressure-fluid supply reservoir 20. As soon as the piston 6 is displaced by the pedal force F from its illustrated position in the direction of the arrow, the valve ball 10 will seat on the valve seat and thereby close the connecting channel 12. Depending on the magnitude of the pedal force F, the central control valves 10, 11 may adopt a breathering position, with the pistons 6, 7 lifting at least partially from the stop members 53, 54.

When a traction slip control action is performed, the directional control valves 84, 85 which are normally opened in their de-energized state will be closed, and the directional control valves 86, 87 which are normally closed in their de-energized state will be switched to open so that pressure fluid is delivered out of the pressure-fluid accumulators 76, 77 and/or by the simultaneously starting pumps 21, 26 into the two branch lines 47, 49 and enable braking of any one or both of the two driven wheels 31, 33, also designated as HL, HR of the vehicle depending upon which of the two inlet valves 24, 29 is actuated.

Figure 2:
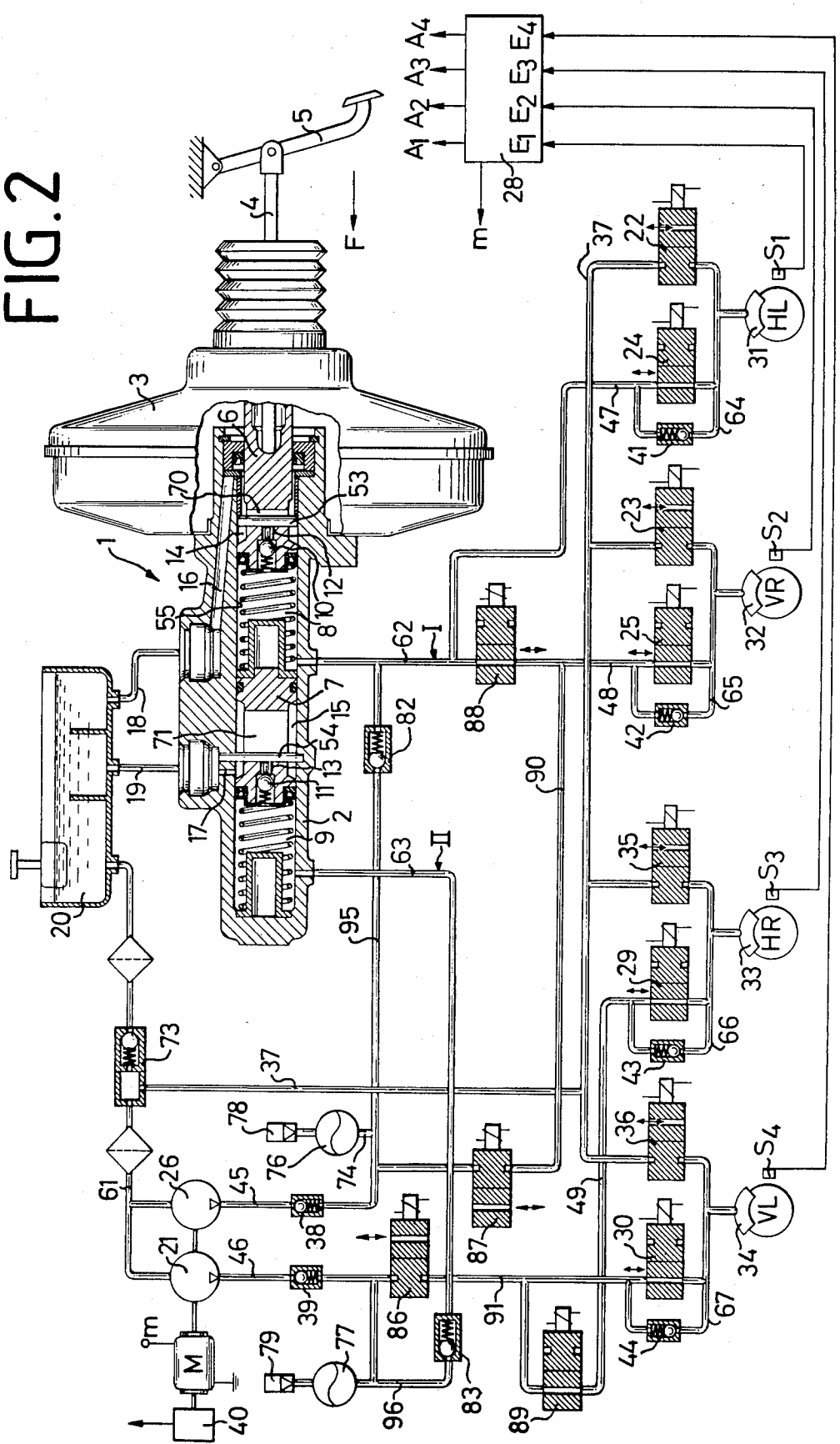
FIG. 2 is partial cross section and schematic representation showing details of an alternative embodiment of a brake system according to the invention.

The brake system according to FIG. 2 differs from that according to FIG. 1 in that it is for use on a vehicle with front-wheel drive and, for this purpose, includes two normally, i.e., when de-energized, open directional control valves 88, 89. One of the valves is provided in the branch line 48 and the other one in the branch line 49. On traction slip control action, these directional control valves 88, 89 will be closed at once so that the pressure fluid is allowed to flow through the pressure lines 90, 91 to the wheel brakes 32, 34 also designated as VR, VL after change-over of the directional control valves 86, 87.

Figure 3:
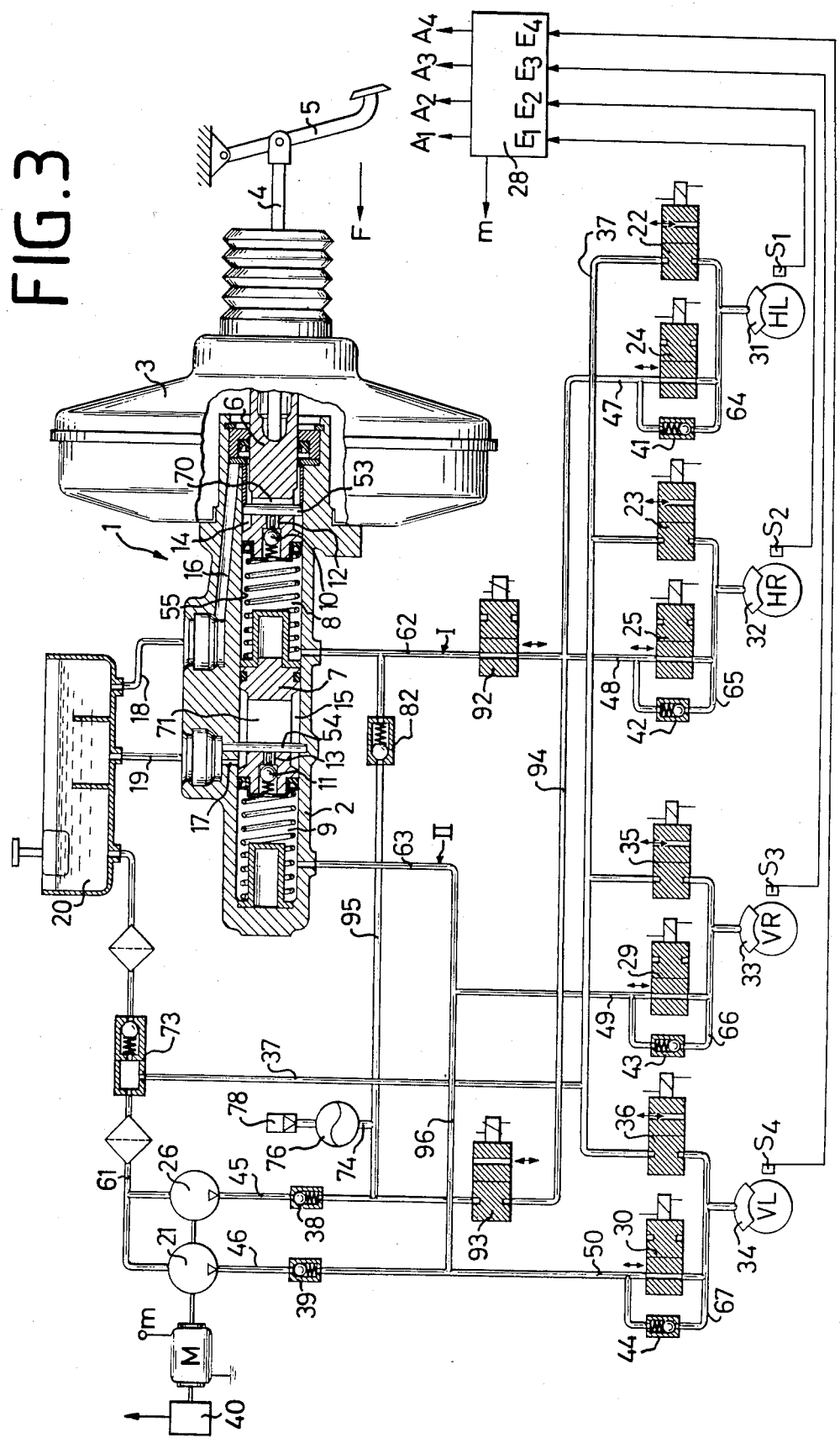
FIG. 3 is partial cross section and schematic representation showing details of another alternative embodiment of a brake system according to the invention.

The brake system according to FIG. 3 is suitable for a vehicle with rear-wheel drive, wherein the brake circuit I feeds the wheel brakes 31, 32 of the rear axle and the brake circuit II feeds the wheel brakes 33, 34 of the front axle. This brake system comprises in total only one directional control valve 92 normally open in its de-energized state and one valve 93 normally closed in its de-energized state. Accordingly, there is provided only one accumulator 76 with a pressure-monitoring switch 78. When traction slip control is effected, the pressure fluid flows out of the accumulator 76 or from the pump 26, respectively, through the opened directional control valve 93 and through the pressure line 94 to the branch lines 47, 48 which, in this case, are in communication with the wheel brakes 31, 32 of the rear axle. Simultaneously, the directional control valve 92 must be switched to assume its closed position.

Assigned to the pressure-fluid accumulators 76, 77 are pressure-monitoring switches 78, 79 which, upon attainment of a minimum or maximum pressure, send signals to the signal-processing circuit 28 which, in turn, correspondingly switches on or off the motor M of the pumps 21, 26.

What is claimed is:

1. An anti-lock brake system with traction slip control of the type including a brake pedal, auxiliary-force-assisted braking pressure generator including a master cylinder having two pressure chambers, to which two brake circuits each including a pair of wheel brakes are connected by two main brake lines, at least one auxiliary-pressure hydraulic pump, wheel sensor means, and electronic circuit means for determining rotational behavior of the wheels and for generating electric braking-pressure control signals which, for the purpose of slip control, electromagnetically actuatable pressure-fluid inlet valves and outlet valves, two inlet valves provided in each of said main brake lines, one inlet valve at each wheel brake, each main brake line communicating through a supply line with at least one hydraulic pump, said outlet valves connected to a supply reservoir by a return line and suction ports of said at least one pump connected to the supply reservoir by a suction line, at least one electromagnetic control valve provided in at least one of said two supply lines through which pressure fluid is deliverable into at least one of said brake circuits during traction slip control, a portion of the supply line which interconnects at least one pump and said at least one electromagnetic control valve communicates by way of a short-circuit line with one of the main brake lines that interconnects the pressure chamber of said master cylinder and the wheel brake, a pressure-relief valve provided in the short-circuit line, said pressure relief valve adapted to permit the delivery of pressure fluid in a direction through the short-circuit line into said one main brake line after a minimum pressure is exceeded, said pressure relief valve adapted to preclude pressure fluid flow in an opposite direction, and at least one pressure-fluid accumulator in direct connection to said short-circuit line, said at least one accumulator supplied by said at least one pump until attainment of said minimum pressure.

2. The brake system as claimed in claim 1 wherein the suction line of said at least one pump communicates with the return line interconnecting each outlet valve and the supply reservoir.

3. The brake system as claimed in claim 1 wherein each brake circuit includes a pump having its own pressure accumulator and supply line, two short-circuit lines each connected to one of said supply lines, each short-circuit line in communication with one of two pressure chambers of the master cylinder.

4. The brake system as claimed in claim 1 wherein each main brake line includes branch lines connecting to said inlet valves, each branch line includes a by-pass line by-passing each respective inlet valve, and a non-return valve in each by-pass line adapted to permit return flow of pressure fluid from each wheel brake into the respective main brake line.

5. The brake system as claimed in claim 1 wherein a central control valve is arranged in a piston of the master cylinder and includes a valve member which is longitudinally slidable in a recess in the piston, said valve member cooperates with a tappet, said tappet moves the valve member into an opened position when the piston is in a release position, said tappet taking support on a stationary stop in said master cylinder.

6. The brake system as claimed in claim 5 wherein the valve member of the central control valve is acted upon by a spring in a closing direction and cooperates with a valve seat fixedly arranged at the piston of the master cylinder.

7. The brake system as claimed in claim 5 wherein the stationary stop is stationarily supported in a wall of the master cylinder and extends through a recess in the piston.

8. The brake system as claimed in claim 3 further including a pressure-monitoring switch connected to each accumulator.

9. The brake system as claimed in claim 8 further including additional valves provided in lines interconnecting each pressure fluid accumulator and a respective branch line to the inlet valves, said additional valves being two-way/two-position directional control valves actuatable electromagnetically by the electronic circuit means.

10. The brake system as claimed in claim 9 wherein the additional valves are closed in their de-energized condition.

* * * * *